United States Patent

Iwai

[11] Patent Number: 6,072,527
[45] Date of Patent: Jun. 6, 2000

[54] DARK SHADING CORRECTION CIRCUIT

[75] Inventor: Nobuo Iwai, Hirakata, Japan

[73] Assignee: Matsushita Electric Industrial Co., Ltd., Osaka, Japan

[21] Appl. No.: 08/836,553

[22] PCT Filed: Sep. 18, 1996

[86] PCT No.: PCT/JP96/02672

§ 371 Date: May 19, 1997

§ 102(e) Date: May 19, 1997

[87] PCT Pub. No.: WO97/11555

PCT Pub. Date: Mar. 27, 1997

[30] Foreign Application Priority Data

Sep. 19, 1995 [JP] Japan ................................. 7-239464

[51] Int. Cl.[7] .............................................. H04N 9/64
[52] U.S. Cl. ..................................... 348/243; 348/250
[58] Field of Search .................................. 348/243, 245, 348/241, 250

[56] References Cited

U.S. PATENT DOCUMENTS

| 5,105,276 | 4/1992 | Schrock | 348/243 |
| 5,272,536 | 12/1993 | Sudo et al. | 348/243 |
| 5,376,966 | 12/1994 | Takase | 348/243 |
| 5,512,947 | 4/1996 | Sawachi et al. | 348/243 |
| 5,757,440 | 5/1998 | Mangelsdorf | 348/243 |

FOREIGN PATENT DOCUMENTS

| 4-207275 | 7/1992 | Japan . |
| 6-54261 | 2/1994 | Japan . |

Primary Examiner—Wendy Garber
Assistant Examiner—Jacqueline Wilson
Attorney, Agent, or Firm—Wenderoth, Lind & Ponack, L.L.P.

[57] ABSTRACT

A dark shading correction circuit, used for a television camera or a video camera, is provided for canceling a dark shading signal component contained in a video signal outputted from an image pickup device (6), thereby effecting the dark shading correction on the video signal. In synchronization with a vertical synchronizing signal, the image pickup device (6) outputs a video signal containing an optical black reference signal outputted in response to each horizontal scanning signal, while a timing signal generator (10) generates at least two timing signals for detecting the optical black reference signal in the video signal. On the other hand, detection means (7a, 7b) detect at least two optical black reference signals contained in the video signal based on the at least two timing signals. Correction signal generating means (3, 8, 9) generate and output a correction signal for correcting the video signal in synchronization with the vertical synchronizing signal, based on the detected at least two optical black reference signals, so that the dark shading signal component contained in the video signal is canceled.

6 Claims, 11 Drawing Sheets

DARK SHADING CORRECTION CIRCUIT

TECHNICAL FIELD

The present invention relates to a dark shading correction circuit for use in a television camera or a video camera, the circuit intended for canceling a dark shading signal component contained in a video signal outputted from a charge coupled device (referred to as a CCD hereinafter) which is a solid-state image pickup device, thereby effecting a dark shading correction on the video signal.

BACKGROUND ART

Even in a state in which no incident light is incident on a CCD of a television camera or a video camera, or in a state in which the lens aperture is completely stopped down, it is sometimes the case where a video signal generated as if a faint light were incident on the video signal is outputted. This signal component that is unnecessary in itself is generated mainly due to a dark current of a driving circuit and the like provided inside the CCD, and it is so called the dark shading signal component. As a circuit for executing the dark shading correction by removing this dark shading signal component, there has been provided a dark shading correction circuit.

FIG. 5 is a block diagram showing a construction of a television camera provided with a prior art dark shading correction circuit 500, and the television camera provided with the dark shading correction circuit will be described with reference to the accompanying drawings.

In FIG. 5, a CCD 1, which is a solid-state image pickup device, converts pickup light that is incident via a taking lens (not shown) of the television camera into an electric signal in synchronization with a vertical synchronizing signal VD and a horizontal synchronizing signal HD, and outputs the signal to a preamplifier 2. The preamplifier 2 takes out, for example, RGB video signals of three colors R (Red), G (Green) and B (Blue) in the case of a three-plate type camera by sampling the electric signal outputted from the CCD 1 at a predetermined sampling frequency in synchronization with the vertical synchronizing signal VD and the horizontal synchronizing signal HD and thereafter amplifies the signal to output the video signal after the amplification to an adder 5. In the following signal processing, the signals are processed individually by the three colors R, G and B.

The dark shading correction circuit 500 comprises a sawtooth wave signal generator 3, an amplitude adjuster 4 and the adder 5. The sawtooth wave signal generator 3 is reset in response to the vertical synchronizing signal VD to generate a sawtooth wave signal having the opposite polarity in order to cancel the above-mentioned dark shading signal component, and output the signal to the amplitude adjuster 4. The amplitude adjuster 4 comprises, for example, a pre-set resistor element. By manually changing the resistance value of the pre-set resistor element, the amplitude of the inputted sawtooth wave signal is adjusted, and the sawtooth wave signal after the amplitude adjustment is outputted as a correction sawtooth wave signal. The adder 5 adds the video signal inputted from the preamplifier 2 to the correction sawtooth wave signal inputted from the amplitude adjuster 4 thereby cancelling the dark shading signal component, and outputs the video signal after the correction to a video signal processing circuit 13. The video signal processing circuit 13 executes a gamma processing and a matrix signal processing for conversion of the signal into, for example, an NTSC signal, and outputs the processed video signal to a magnetic recording and reproducing apparatus 14 for recording the signal on, for example, a magnetic tape.

When adjusting the pre-set resistor element of the amplitude adjuster 4, an operator performs adjustments by rotating an adjustment portion of the pre-set resistor element using a screwdriver so that the signal component of the video signal becomes substantially zero while monitoring the video signal outputted from the adder 5 by means of, for example, a CRT display monitor with the lens aperture of the television camera stopped down completely, i.e., so that the dark shading signal component of the video signal is canceled in the manufacturing process of the television camera.

An increase of the dark shading signal component due to a dark current of a driving circuit or the like in the CCD cannot be ignored. The dark shading signal component tends to have an approximate sawtooth waveform synchronized with the vertical synchronizing signal VD. By adding a correction sawtooth wave signal which has the polarity opposite to that of the dark shading signal component and an amplitude approximately identical to the signal component to the video signal outputted from the preamplifier 2, the dark shading signal component can be canceled. That is, when the dark shading signal component outputted from the preamplifier 2 has a waveform approximate to the sawtooth waveform, a video signal which has undergone a sufficient dark shading correction is obtained in the output from the adder 5.

In fact, an actual dark shading correction circuit executes the dark shading correction in the horizontal scanning direction in addition to the above. However, the present invention has no connection with it, and therefore, no description is provided therefor.

When the dark current of the driving circuit or the like in the CCD 1 changes due to, for example, a change in the environmental temperature of the CCD 1, the dark shading signal component outputted from the preamplifier 2 changes. In particular, when the environmental temperature of the CCD 1 is elevated, the dark current of the driving circuit or the like in the CCD 1 increases to increase the dark shading signal component. However, in the above-mentioned prior art dark shading correction circuit, an amplitude adjustment amount of the pre-set resistor element of the amplitude adjuster 4 is fixed after being once adjusted in the manufacturing process as described above, and therefore, it does not follow the possible variation of the dark shading signal component. In particular, when there is a great temperature difference between the current temperature and the temperature at which the amplitude adjuster 4 was adjusted, no sufficient dark shading correction can be effected, and this has caused such a problem that the dark shading signal component disadvantageously remains in the video signal outputted from the adder 5. The remaining dark shading signal component will be referred to as a remaining dark shading signal component hereinafter. When the video signal outputted from the adder 5 is outputted directly to a CRT display or a LCD monitor in the above state, a brightness difference between an upper portion and a lower portion of the screen of the monitor may occur or the display color may vary.

An object of the present invention is to solve the above-mentioned problems and provide a dark shading correction circuit capable of automatically adaptively executing the dark shading correction even when there is a variation of a dark shading signal component due to a change in temperature of the CCD or the like in a television camera or a video camera employing the CCD, thereby always canceling the remaining dark shading signal component.

DISCLOSURE OF THE INVENTION

According to the first aspect of the present invention, there is provided a dark shading correction circuit comprising:

an image pickup device for, in synchronization with a vertical synchronizing signal, outputting a video signal containing an optical black reference signal outputted in response to each horizontal scanning signal;

timing signal generating means for generating and outputting at least two timing signals for detecting the optical black reference signal in the video signal;

detection means for detecting and outputting at least two optical black reference signals contained in the video signal outputted from said image pickup device based on the at least two timing signals outputted from the timing signal generating means;

correction signal generating means for generating and outputting a correction signal for correcting the video signal outputted from the image pickup device in synchronization with the vertical synchronizing signal so that a dark shading signal component contained in the video signal outputted from the image pickup device is canceled based on the at least two optical black reference signals outputted from the detection means; and adder means for adding the video signal outputted from the image pickup device to the correction signal outputted from the correction signal generating means thereby substantially canceling the dark shading signal component contained in the video signal outputted from the image pickup device, and for outputting the video signal which has undergone the dark shading correction.

Further, in the above-mentioned dark shading correction circuit, the correction signal generating means comprises:

sawtooth wave signal generating means for generating a sawtooth wave signal having a sawtooth signal waveform for canceling the dark shading signal component contained in the video signal outputted from the image pickup device;

subtracter means for calculating a difference between each combination of two optical black reference signals outputted from the detection means thereby generating and outputting a difference signal representing the calculated difference; and amplitude adjusting means for executing adjustment, based on the difference signal outputted from the subtracter means, so that an amplitude of the sawtooth wave signal outputted from the sawtooth wave signal generating means is proportional to the difference signal, and for outputting the sawtooth wave signal whose amplitude has been adjusted as a correction signal.

Furthermore, in the above-mentioned dark shading correction circuit, said correction signal generating means comprises:

control means for functionally approximating the dark shading signal component contained in the plurality of n optical black reference signals to a predetermined (n−1)-th order function, based on a plurality of n optical black reference signals outputted from the detection means, for calculating n coefficient values of the functionally approximated (n−1)-th order function, and for generating and outputting a correction signal for correcting the video signal outputted from the image pickup device so that the dark shading signal component contained in the video signal outputted from the image pickup device is canceled by means of the (n−1)-th order function containing the calculated n coefficient values.

According to the second aspect of the present invention, there is provided a dark shading correction circuit comprising:

an image pickup device for, in synchronization with a vertical synchronizing signal, outputting a video signal containing an optical black reference signal outputted in response to each horizontal scanning signal;

timing signal generating means for generating and outputting at least two timing signals for detecting the optical black reference signal in the video signal;

adder means for adding the video signal outputted from the image pickup device to a correction signal for effecting dark shading correction on the video signal, and for outputting a video signal of a result of addition;

detection means for detecting and outputting at least two optical black reference signals contained in the video signal outputted from the adder means based on at least two timing signals outputted from the timing signal generating means; and correction signal generating means for generating a correction signal for correcting the video signal outputted from the image pickup device in synchronization with the vertical synchronizing signal so that a remaining dark shading signal component contained in the video signal outputted from the adder means is canceled based on the at least two optical black reference signals outputted from the detection means and outputting the correction signal to the adder means;

the adder means adding the video signal outputted from the image pickup device to the correction signal outputted from the correction signal generating means thereby substantially canceling the remaining dark shading signal component contained in the video signal outputted from the adder means and outputting the video signal which has undergone the dark shading correction.

Further, in the above-mentioned dark shading correction circuit, the correction signal generating means comprises:

sawtooth wave signal generating means for generating a sawtooth wave signal having a sawtooth wave signal waveform for canceling the dark shading signal component contained in the video signal outputted from the image pickup device;

subtracter means for calculating a difference between each combination of two optical black reference signals outputted from the detection means thereby generating and outputting a difference signal representing the calculated difference;

integration means for time-integrating the difference signal outputted from the subtracter means, and for generating and outputting a time-integrated integration signal; and amplitude adjusting means for executing adjustment, based on the integration signal outputted from the integration means, so that an amplitude of the sawtooth wave signal outputted from the sawtooth wave signal generating means is proportional to the integration signal, and for outputting the sawtooth wave signal whose amplitude has been adjusted as a correction signal.

Furthermore, in the above dark shading correction circuit, the correction signal generating means comprises:

control means for functionally approximating the dark shading signal component contained in the plurality of n optical black reference signals to a predetermined (n−1)-th order function, based on a plurality of n optical black reference signals outputted from the detection means, for calculating n coefficient values of the functionally approximated (n−1)-th order function, and for generating and outputting a correction signal for correcting the video signal outputted from the image pickup device so that the dark shading signal component contained in the video signal outputted from the image pickup device is canceled by means of the (n−1)-th order function containing the calculated n coefficient values.

Therefore, according to the present invention, the shading correction is executed automatically and adaptively so that the dark shading signal component is minimized even when the dark shading signal component changes due to a change in the environmental temperature, aging or the like, thereby always minimizing the remaining dark shading signal component and allowing an image quality with a small quantity of remaining dark shading signal component to be maintained.

BEST MODE FOR CARRYING OUT THE INVENTION

Preferred embodiments of the present invention will now be described with reference to the accompanying drawings.

FIRST PREFERRED EMBODIMENT

Figure 1:
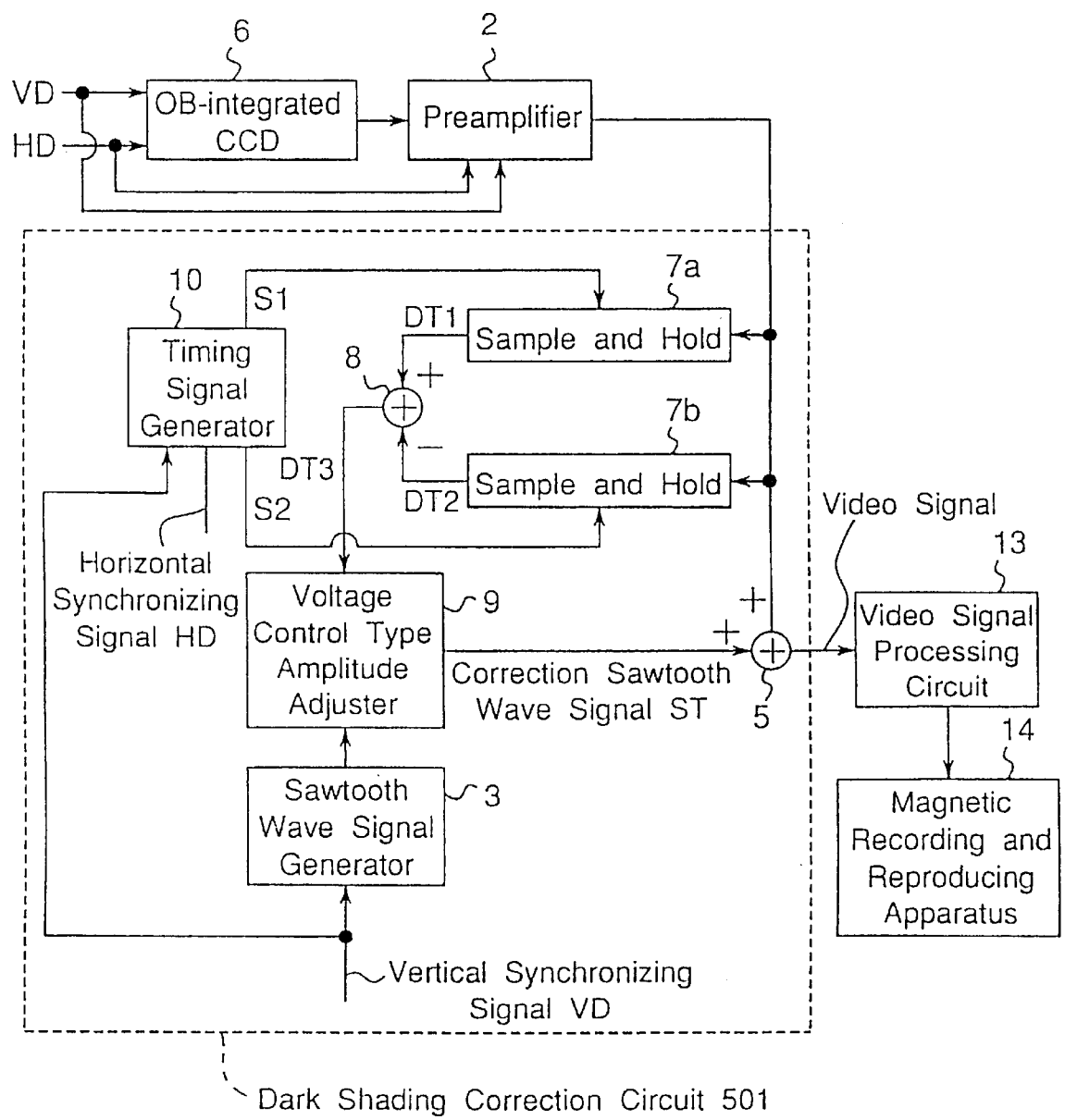
FIG. 1 is a block diagram showing a construction of a television camera provided with a dark shading correction circuit 501 according to a first preferred embodiment of the present invention.
Figure 5:
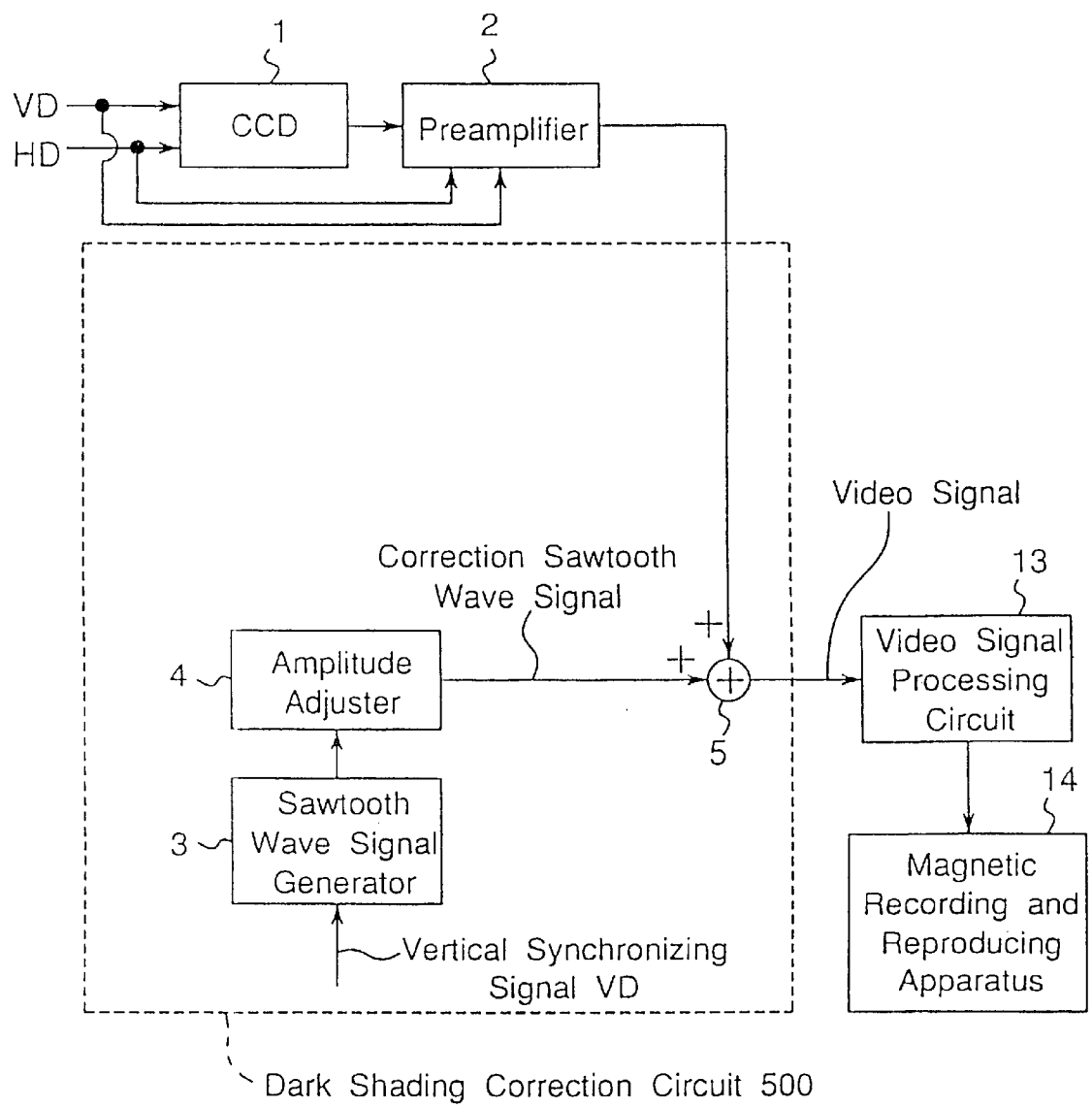
FIG. 5 is a block diagram showing a construction of a television camera provided with a prior art dark shading correction circuit 500.

FIG. 1 is a block diagram showing a construction of a television camera provided with a dark shading correction circuit 501 according to a first preferred embodiment of the present invention. The television camera of the first preferred embodiment is characterized in comprising a known CCD (referred to as an OB-integrated CCD hereinafter) 6 having a structure for outputting an optical black reference signal (referred to as an OB signal hereinafter) in place of the CCD 1 of the prior art shown in FIG. 5. In the dark shading correction circuit 501, the OB signal in the video signal outputted from the OB-integrated CCD 6 via the preamplifier 2 is sampled at two timings t1 and t2 (See FIG. 8) for one vertical interval from one vertical synchronizing signal VD to the next vertical synchronizing signal VD. Based on a difference between the signal levels of the sampled two OB signals, the amplitude of a sawtooth wave signal outputted from a sawtooth wave signal generator 3 is adjusted by means of a voltage control type amplitude adjuster 9, and a correction sawtooth wave signal ST after the adjustment is outputted to the adder 5. By this operation, a dark shading signal component DS of the video signal outputted from the preamplifier 2 is canceled by means of the correction sawtooth wave signal ST, thereby executing the dark shading correction.

Figure 6:
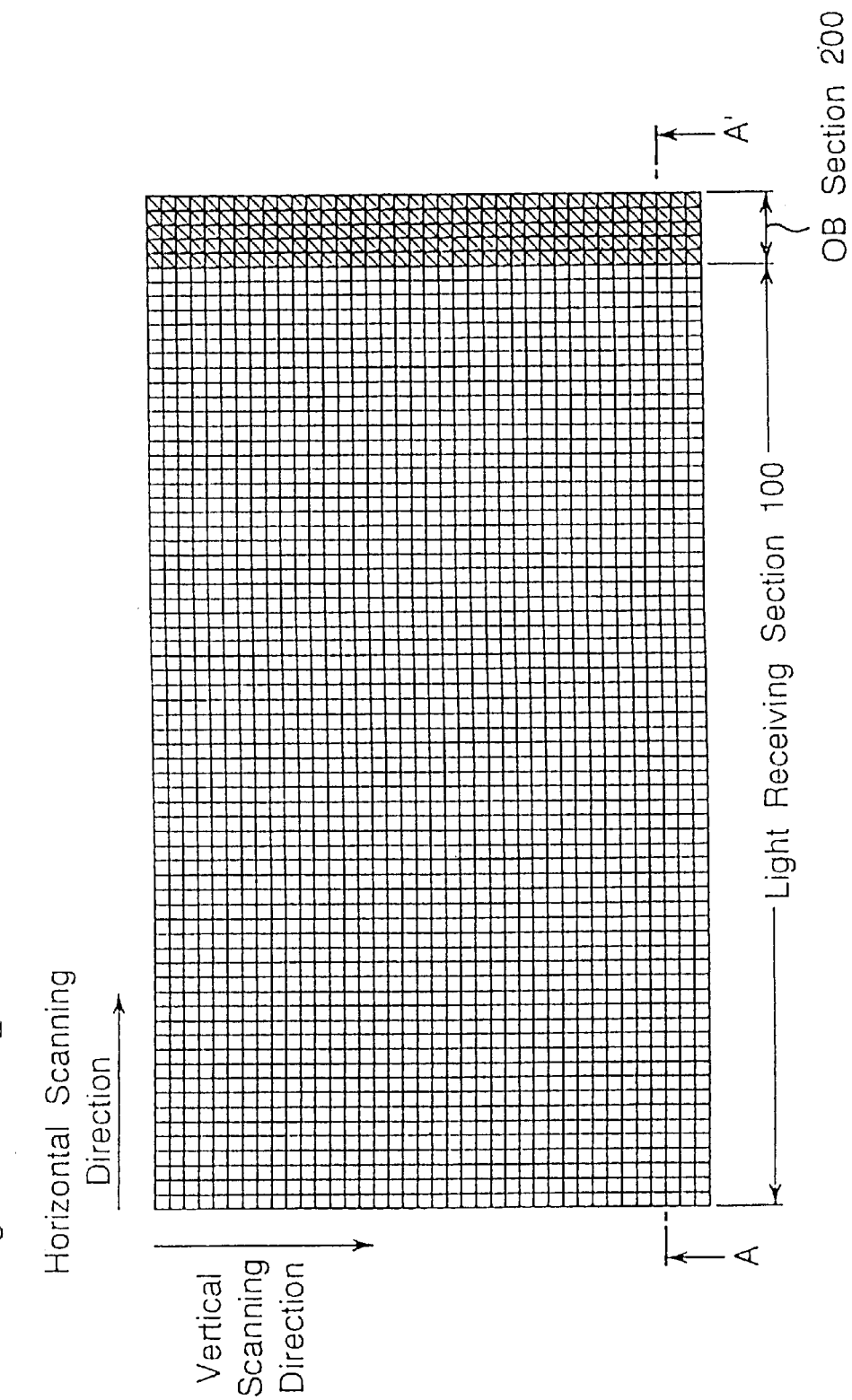
FIG. 6 is a plan view showing a construction of an OB-integrated CCD 6 shown in FIGS. 1 to 4.
Figure 7:
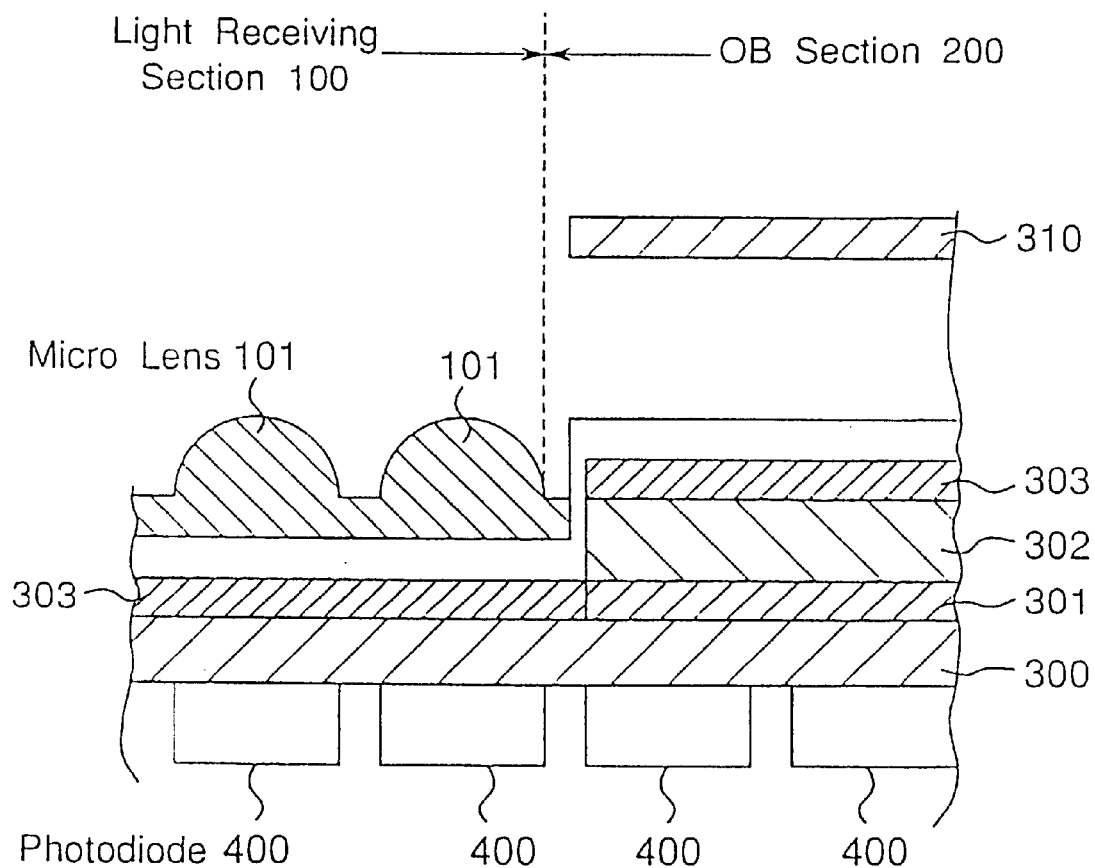
FIG. 7 is a sectional view of a part of the OB-integrated CCD 6 taken along the line A–A' in FIG. 6.

FIG. 6 is a plan view showing a construction of the OB-integrated CCD 6 shown in FIG. 1, and FIG. 7 is a sectional view of the CCD cut in a direction parallel to the horizontal scanning direction, i.e., a sectional view of a part of the OB-integrated CCD 6 taken along the line A–A' in FIG. 6.

The OB-integrated CCD 6 has a structure for outputting an OB signal representing the signal level of the video signal of optical black when no light is incident on the CCD 6 at each horizontal scanning signal HD. In FIG. 6, cells represent pixels of the CCD 6, and the OB-integrated CCD 6 comprises: a light receiving section 100 which is located from a center portion to the left-hand end portion except for its right-hand end portion and operates to receive image pickup incident light that is incident via the taking lens of the television camera, photoelectrically convert the incident light and thereafter output a video signal corresponding to the image pickup incident light; and an OB section 200 which outputs the OB signal while blocking off the image pickup incident light. According to one preferred embodiment of the OB-integrated CCD 6 for an NTSC video signal, the CCD 6 has a screen of 816 pixels (in the horizontal scanning direction)×495 pixels (in the vertical scanning direction), where ten pixels located in the right-hand end portion constitute the OB section 200.

As shown in FIG. 7, a plurality of photodiodes 400 corresponding to the pixels are formed on a substrate (not shown), and an $SiO_2$ insulating layer 300 is formed on it. In the light receiving section 100, micro lenses 101 corresponding to the pixels are formed on the $SiO_2$ insulating layer 300. On the other hand, in the OB section 200, after an Al metal film 302 is formed on the $SiO_2$ insulating layer 300 via an insulating film 301 made of a predetermined electrically insulating material, a protective film 303 is formed on the Al metal film 302, and further a flare preventing plate 310 is formed on the protective film 303. In this case, the Al metal film 302 and the flare preventing plate 310 constitute a shield film for blocking off the image pickup incident light.

In the OB-integrated CCD 6 constructed as above, the light receiving section 100 receives image pickup incident light that is incident via the taking lens of the television camera, photoelectrically converts the incident light and thereafter outputs the video signal corresponding to the image pickup incident light. On the other hand, the OB section 200 blocks off the image pickup incident light and outputs the OB signal. That is, the photodiodes 400 of the OB section 200 are optically shielded, and therefore, the video signal from the OB section 200 is outputted always as the OB signal representing the signal level of the video signal of the optical black when no light is incident. Further, in the OB-integrated CCD 6, the OB section 200 is located on the right-hand side of the light receiving section 100 of the CCD 6 and is located at the right-hand end portion of the CCD 6. Therefore, in each horizontal scanning line, the OB signal is outputted from the OB section 200 subsequently to the video signal outputted from the light receiving section 100, i.e., at the end of each horizontal scan. The OB signal represents the signal level of the video signal of the optical black when no light is incident. However, the signal level changes due to a dark current of the driving circuit and the like in the CCD 6, and the OB signal includes the dark shading signal component DS, or the variation component of the signal level. Therefore, by detecting the OB signal, the dark shading signal component DS can be detected.

In FIG. 1, the OB-integrated CCD 6, which is the solid-state image pickup device, converts the pickup light incident via the taking lens of the television camera into an electric signal in synchronization with the vertical synchronizing signal VD and the horizontal scanning signal HD, and outputs the resulting signal to the preamplifier 2. The preamplifier 2 samples the electric signal outputted from the OB-integrated CCD 6 at a predetermined sampling frequency in synchronization with the vertical synchronizing signal VD and the horizontal scanning signal HD so as to take out, for example, RGB video signals of three colors of R (Red), G (Green) and B (Blue) in the case of three-plate type camera, thereafter amplifies the signals and outputs the amplified video signal to the adder 5 and the two sample and hold circuits 7a and 7b. In the following signal processing, the signals are processed individually by the three colors R, G and B.

The dark shading correction circuit 501 of the first preferred embodiment comprises a sawtooth wave signal generator 3, a timing signal generator 10, two sample and hold circuits 7a and 7b, a subtracter 8, a voltage control type amplitude adjuster 9 and an adder 5. The sawtooth wave signal generator 3 is reset in response to the vertical synchronizing signal VD, generates a sawtooth wave signal having the opposite polarity for canceling the dark shading signal component DS, and outputs the signal to the voltage control type amplitude adjuster 9. In this case, as shown in FIG. 8, the sawtooth wave signal is a signal which changes from the trailing timing of the vertical synchronizing signal VD via a vertical blanking interval (not shown) to abruptly rise to a positive maximum amplitude A in accordance with a predetermined timing after the vertical blanking interval and thereafter reduce with a predetermined inclination to come to have a zero level in accordance with a predetermined timing before the rise timing of the next vertical synchronizing signal VD.

Figure 8:
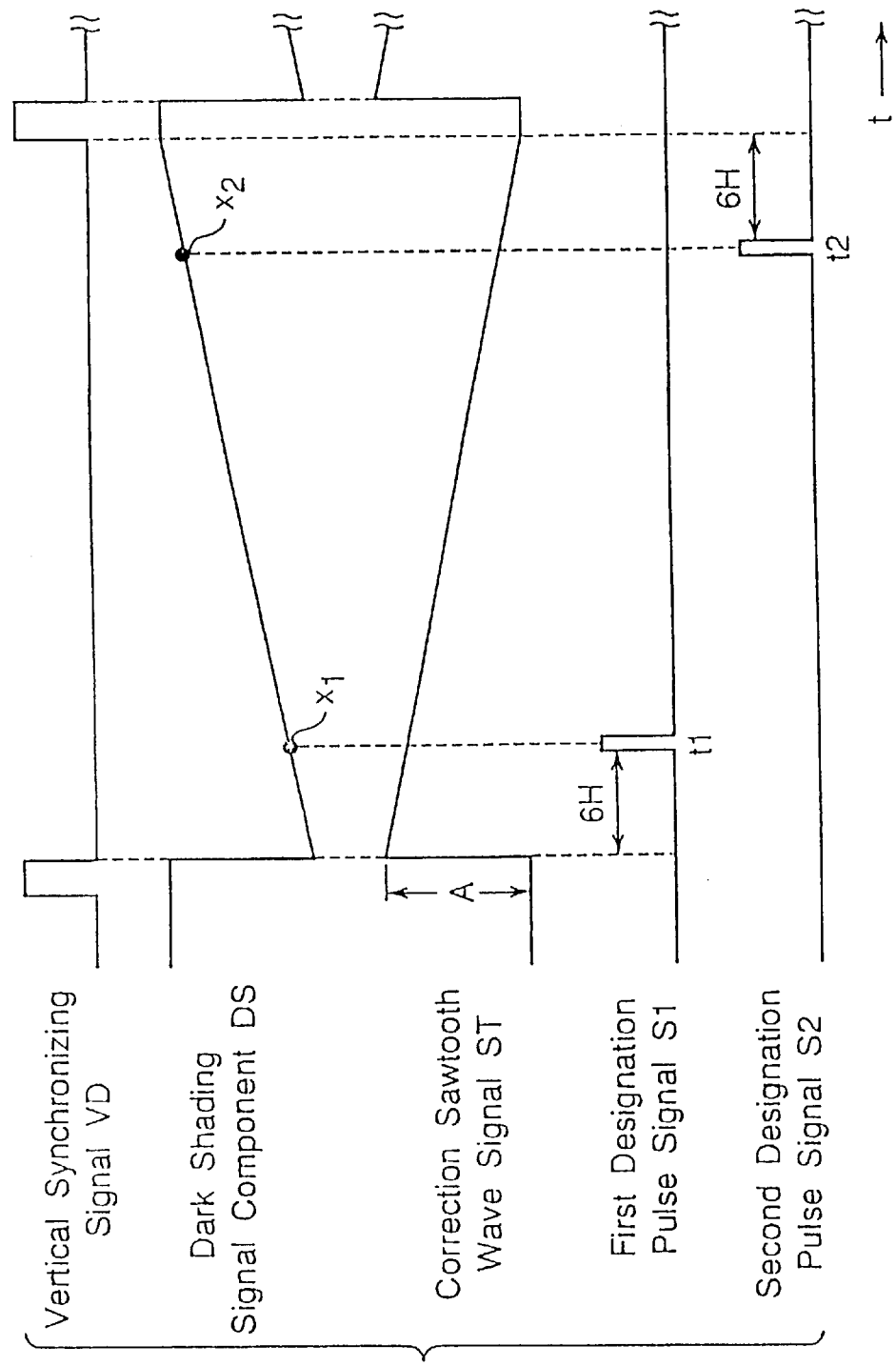
FIG. 8 is a timing chart of signals showing operations of the dark shading correction circuit 501 of the first preferred embodiment shown in FIG. 1 and the dark shading correction circuit 502 of the second preferred embodiment shown in FIG. 2.

On the other hand, as shown in FIG. 8, the timing signal generator 10 generates a first designation pulse signal S1 and a second designation pulse signal S2 which are timing signals at two timings of t1 and t2 respectively for one vertical interval from one vertical synchronizing signal VD to the next vertical synchronizing signal VD based on the vertical synchronizing signal VD and the horizontal scanning signal HD, and outputs the signals to the sample and hold circuits 7a and 7b. In this case, the first designation pulse signal S1 is generated, for example, at the timing ti corresponding to the OB section 200 of the sixth horizontal scanning interval from the vertical synchronizing signal VD and has a pulse width of an interval corresponding to the width of the OB section 200 in the horizontal scanning direction. On the other hand, the second designation pulse signal S2 is generated, for example, at the timing t2 corresponding to the OB section 200 of the 489th horizontal scanning interval from the vertical synchronizing signal VD and has a pulse width of an interval corresponding to the width of the OB section 200 in the horizontal scanning direction.

As shown in FIG. 8, the sample and hold circuit 7a samples the video signal inputted from the preamplifier 2 and maintains the signal level for the interval designated by the first designation pulse signal S1 thereby detecting a signal level $x_1$ of the OB signal at the timing ti in the video signal, and outputs a first detection signal DT1 representing the detected signal level $x_1$ to the subtracter 8. On the other hand, as shown in FIG. 8, the sample and hold circuit 7b samples the video signal inputted from the preamplifier 2 and maintains the signal level for the interval designated by the second designation pulse signal S2 thereby detecting a signal level $x_2$ of the OB signal at the timing t2 in the video signal, and outputs a second detection signal DT2 representing the detected signal level $x_2$ to the subtracter 8.

The subtracter 8 subtracts the inputted second detection signal DT2 from the inputted first detection signal DT1 to generate a third detection signal DT3 representing a signal level $(x_1-x_2)$ of a result of subtraction, and outputs the signal to the voltage control type amplitude adjuster 9. In response to this, the voltage control type amplitude adjuster 9 changes the amplitude A of the sawtooth wave signal inputted from the sawtooth wave signal generator 3 according to the signal level $(x_1-x_2)$ of the inputted third detection signal DT3 thereby changing the inclination of the sawtooth wave signal, so that the voltage control type amplitude adjuster 9 generates a correction sawtooth wave signal ST which is proportional to the signal level $(x_1-x_2)$ of the third detection signal DT3 and has an amplitude having a polarity opposite to that of the dark shading signal component DS contained in the OB signal and outputs the signal to the adder 5. The adder 5 adds the video signal inputted from the preamplifier 2 to the correction sawtooth wave signal inputted from the voltage control type amplitude adjuster 9, and outputs a video signal having a signal level of a result of addition as a video signal after the dark shading correction to the video signal processing circuit 13. The video signal processing circuit 13 executes the gamma processing and the matrix signal processing for conversion into, for example, an NTSC signal, and outputs the processed video signal to a magnetic recording and reproducing apparatus 14 for recording the signal on, for example, a magnetic tape.

In the dark shading correction circuit 501 constructed as above, the sample and hold circuits 7a and 7b, the subtracter 8, the voltage control type amplitude adjuster 9 and the adder 5 constitute a feed forward control type control loop. When the dark shading signal component DS outputted from the CCD 6 via the preamplifier 2 increases due to the rise of environmental temperature, aging or the like, the magnitude (absolute value) of the difference $(x_1-x_2)$ between the signal level $x_1$ of the first detection signal DT1 and the signal level $x_2$ of the second detection signal DT2 increases. In response to this, the maximum amplitude A of the correction sawtooth wave signal ST outputted from the voltage control type amplitude adjuster 9 increases in proportion to the magnitude of the difference $(x_1-x_2)$, then the inclination of the correction sawtooth wave signal ST increases. That is, by increasing the correction sawtooth wave signal ST in proportion to the increase of the dark shading signal component DS for the canceling of the dark shading signal component DS, the dark shading correction can be executed automatically and adaptively so that a remaining dark shading signal component is minimized, thereby allowing the remaining dark shading signal component to be always canceled. As a result, a quality video signal having almost no remaining dark shading signal component can be obtained in the video signal from the adder 5.

As described above, according to the television camera provided with the dark shading correction circuit 501 of the present preferred embodiment, the OB-integrated CCD 6 which outputs the OB signal is provided, and the dark shading correction circuit 501 executes the dark shading correction by sampling the OB signal of the video signal outputted from the OB-integrated CCD 6 via the preamplifier 2 in accordance with two timings t1 and t2 for one vertical interval from one vertical synchronizing signal VD to the next vertical synchronizing signal VD, adjusting the amplitude of the sawtooth wave signal outputted from the sawtooth wave signal generator 3 by means of the voltage control type amplitude adjuster 9 based on the difference between the signal levels of the sampled two OB signals and outputting the correction sawtooth wave signal ST after the adjustment to the adder 5, thereby canceling the dark shading signal component DS of the video signal outputted from the preamplifier 2 by means of the correction sawtooth wave signal ST. With the above arrangement, even when the dark shading signal component DS changes due to a change in the environmental temperature, aging or the like, the shading correction is executed automatically and adaptively so that the remaining dark shading signal component is minimized by canceling the dark shading signal component, thereby allowing a quality video signal having almost no remaining dark shading signal component to be always generated for maintaining good image quality of the video signal.

SECOND PREFERRED EMBODIMENT

Figure 2:
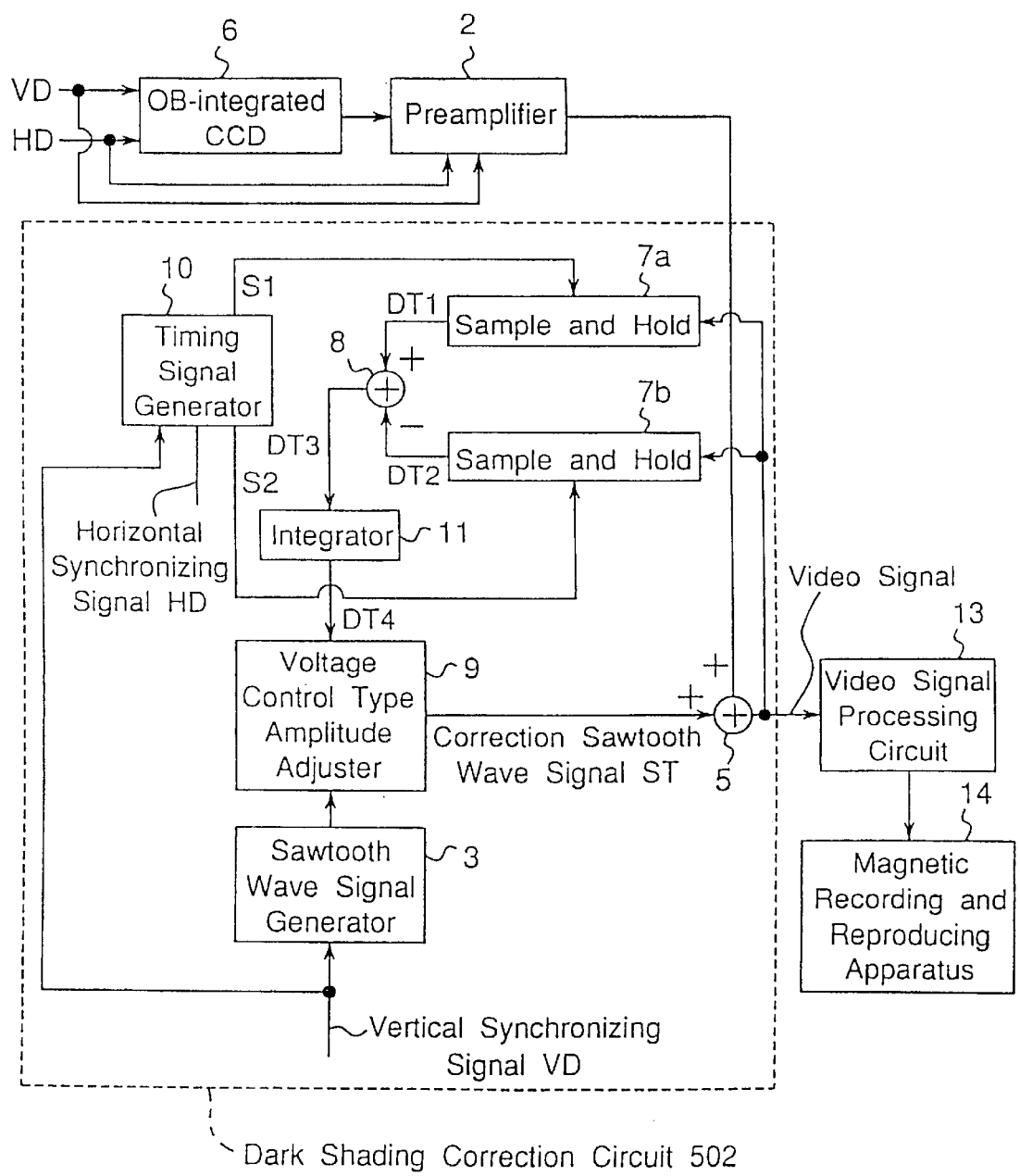
FIG. 2 is a block diagram showing a construction of a television camera provided with a dark shading correction circuit 502 according to a second preferred embodiment of the present invention.

FIG. 2 is a block diagram showing a construction of a television camera provided with a dark shading correction circuit 502 according to a second preferred embodiment of the present invention. The dark shading correction circuit 502 of the second preferred embodiment differs from the first preferred embodiment shown in FIG. 1 in the following points.

(a) The video signal outputted from the preamplifier 2 is inputted to only the adder 5, and the video signal outputted from the adder 5 is inputted to the sample and hold circuits 7a and 7b.

(b) An integrator 11 is inserted between the subtracter 8 and the voltage control type amplitude adjuster 9.

The above points of difference will be described in detail below.

In FIG. 2, by sampling the video signal outputted from the adder 5 for the interval designated by the first designation pulse signal S1 and holding the signal level as shown in FIG. 8, the sample and hold circuit 7a detects the signal level $x_1$ of the OB signal at the timing t1 in the video signal and outputs the first detection signal DT1 representing the detected signal level $x_1$ to the subtracter 8. On the other hand, by sampling the video signal outputted from the adder 5 for the interval designated by the second designation pulse signal S2 and holding the signal level $x_2$ as shown in FIG. 8, the sample and hold circuit 7b detects the signal level $x_2$ of the OB signal at the timing t2 in the video signal and outputs the second detection signal DT2 representing the detected signal level $x_2$ to the subtracter 8.

The subtracter 8 subtracts the inputted second detection signal DT2 from the inputted first detection signal DT1 to generate a third detection signal DT3 representing the signal level $(x_1-x_2)$ of a result of subtraction, and outputs the signal to the integrator 11. In response to this operation, the integrator 11 time-integrates the third detection signal DT3 outputted from the subtracter 8 to generate a fourth detection signal DT4 having an integrated signal level, and outputs the signal to the voltage control type amplitude adjuster 9. In response to this operation, the voltage control type amplitude adjuster 9 changes the amplitude A of the sawtooth wave signal inputted from the sawtooth wave signal generator 3 according to the integrated signal level of the inputted fourth detection signal DT4 thereby changing the inclination of the sawtooth wave signal, so that the voltage control type amplitude adjuster 9 generates a correction sawtooth wave signal ST which is proportional to the integrated signal level of the fourth detection signal DT4 and has an amplitude inverse in polarity to a remaining dark shading signal component outputted from the adder 5 and outputs the signal to the adder 5. The adder 5 adds the video signal inputted from the preamplifier 2 to the correction sawtooth wave signal inputted from the voltage control type amplitude adjuster 9, and outputs the video signal having a signal level of a result of addition as a video signal after the dark shading correction to the video signal processing circuit 13. The video signal processing circuit 13 executes the gamma processing and the matrix signal processing for conversion into, for example, an NTSC signal, and outputs the processed video signal to a magnetic recording and reproducing apparatus 14 for recording the signal on, for example, a magnetic tape.

In the dark shading correction circuit 502 of the second preferred embodiment, by detecting the excess or deficiency $(x_1-x_2)$ of the remaining dark shading signal component contained in the video signal after the dark shading correction outputted from the adder 5 by means of the subtracter 8 and time-integrating the excess or deficiency $(x_1-x_2)$ by means of the integrator 11, the dark shading correction is executed so that the remaining dark shading signal component contained in the video signal outputted from the adder 5 is substantially minimized or made to be substantially zero for a video interval longer than one vertical interval. By this operation, the remaining dark shading signal component is directly subjected to the dark shading correction, and therefore, the remaining dark shading signal component can be reduced in comparison with the first preferred embodiment. It is to be noted that the dark shading signal component DS shown in FIG. 8 is the remaining dark shading signal component remaining in the video signal outputted from the adder 5.

In the dark shading correction circuit 502 constructed as above, the sample and hold circuits 7a and 7b, the subtracter 8, the integrator 11, the voltage control type amplitude adjuster 9 and the adder 5 constitute a feedback control type control loop. When the remaining dark shading signal component outputted from the adder 5 increases due to the rise of environmental temperature, aging or the like of the OB-integrated CCD 6, the magnitude (absolute value) of the difference $(x_1-x_2)$ between the signal level $x_1$ of the first detection signal DT1 and the signal level $x_2$ of the second detection signal DT2 increases. Then, the fourth detection signal DT4 having an integrated signal level obtained by time-integrating the magnitude (absolute value) of the difference $(x_1-x_2)$ is generated. In response to this operation, the maximum amplitude A of the correction sawtooth wave signal ST outputted from the voltage control type amplitude adjuster 9 increases in proportion to the magnitude of the integrated signal level, then the inclination of the correction sawtooth wave signal ST increases. That is, by increasing the correction sawtooth wave signal ST in proportion to the increase of the dark shading signal component for the canceling of the dark shading signal component, the dark shading correction can be executed automatically and adaptively so that the remaining dark shading signal component is minimized, thereby allowing the dark shading signal component to be always canceled. As a result, a quality video signal having almost no remaining dark shading signal component can be obtained in the video signal from the adder 5.

As described above, according to the television camera provided with the dark shading correction circuit 502 of the present preferred embodiment, the OB-integrated CCD 6 for outputting the OB signal is provided, and the dark shading correction circuit 502 executes the dark shading correction by sampling the OB signal of the video signal outputted from the adder 5 at two timings t1 and t2 for one vertical interval from one vertical synchronizing signal VD to the next vertical synchronizing signal VD, adjusting the amplitude of the sawtooth wave signal outputted from the sawtooth wave signal generator 3 by means of the voltage control type amplitude adjuster 9 based on the time-integration value of the difference between the signal levels of the sampled two OB signals and outputting the correction sawtooth wave signal ST after the adjustment to the adder 5, thereby canceling the remaining dark shading signal component of the video signal outputted from the adder 5 by means of the correction sawtooth wave signal ST. With the above arrangement, even when the remaining dark shading signal component changes due to a change in the environmental temperature, aging or the like, the shading correction is executed automatically and adaptively so that the remaining dark shading signal component is minimized by canceling the remaining dark shading signal component, thereby allowing a quality video signal having almost no remaining dark shading signal component to be always generated for maintaining good image quality of the video signal.

THIRD PREFERRED EMBODIMENT

Figure 3:
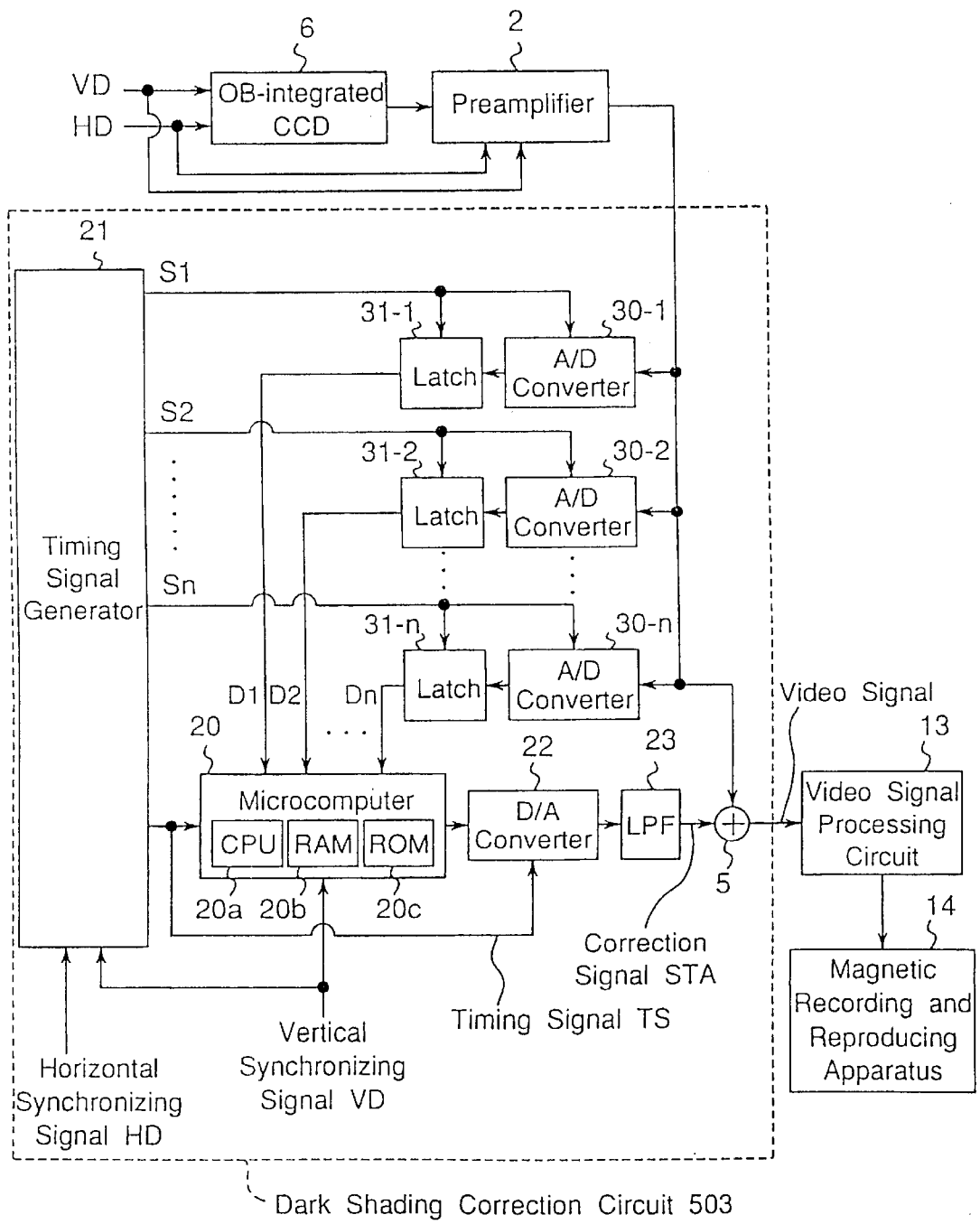
FIG. 3 is a block diagram showing a construction of a television camera provided with a dark shading correction circuit 503 according to a third preferred embodiment of the present invention.
Figure 9:
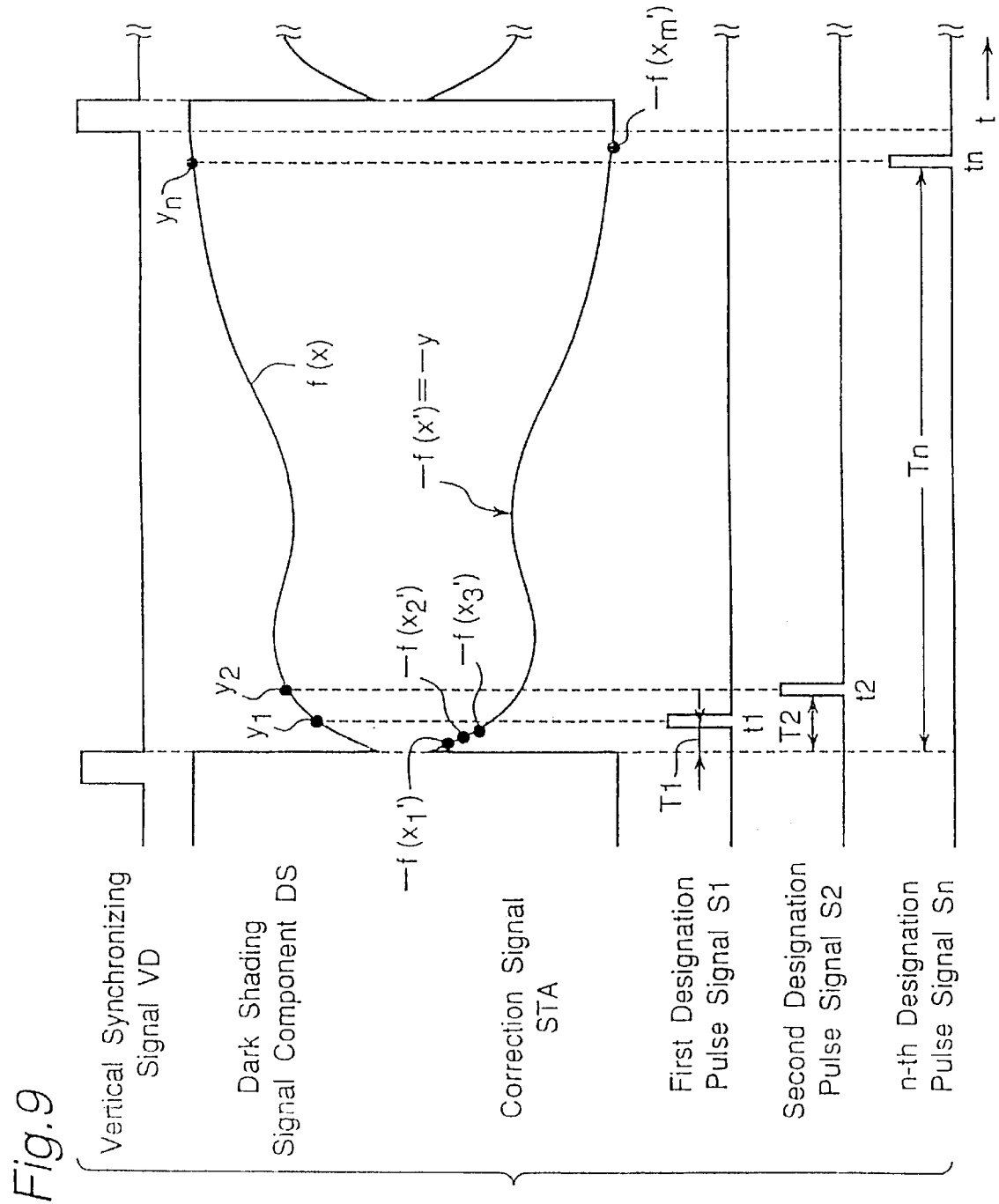
FIG. 9 is a timing chart of signals showing operations of the dark shading correction circuit 503 of the third preferred embodiment shown in FIG. 3 and the dark shading correction circuit 504 of the fourth preferred embodiment shown in FIG. 4.

FIG. 3 is a block diagram showing a construction of a television camera provided with a dark shading correction circuit 503 according to a third preferred embodiment of the present invention. In FIG. 3, the same components as those of FIGS. 1 and 2 are denoted by the same reference numerals. The television camera of the third preferred embodiment is provided with an OB-integrated CCD 6, and the dark shading correction circuit 503 is characterized in the following matters. In the dark shading correction circuit 503, as shown in FIG. 9, the OB signal of the video signal outputted from the OB-integrated CCD 6 via the preamplifier 2 is sampled in accordance with a plurality of n timings t1, t2, . . . , tn (where n is a natural number equal to or larger than 2, See FIG. 9) for one vertical interval from one vertical synchronizing signal VD to the next vertical synchronizing signal VD by means of analog-to-digital converters (each referred to as an A/D converter, and an analog-to-digital conversion being referred to as an A/D conversion hereinafter) 30-1 to 30-n (collectively denoted by the reference numeral 30 hereinafter). The microcomputer 20 executes the dark shading correction by functionally approximating the dark shading signal component DS contained in the OB signal to an (n−1)-th order function by means of an interpolating method based on sampled n OB signal digital data D1, D2, . . . , Dn, obtaining n coefficient values of the functionally approximated (n−1)-th order function by solving simultaneous equations with n unknowns, generating a correction signal STA of −f(x') by means of a function f(x') expressed with the n coefficient values included, and outputting the signal to the adder 5 via a digital-to-analog converter (referred to as a D/A converter and digital-to-analog conversion being referred to as a D/A conversion hereinafter) 22 and a low-pass filter 23, thereby canceling the dark shading signal component DS of the video signal outputted from the preamplifier 2 by means of the correction signal STA.

In FIG. 3, the OB-integrated CCD 6, which is the solid-state image pickup device, converts pickup light that is incident via the taking lens of the television camera into an electric signal in synchronization with the vertical synchronizing signal VD and the horizontal synchronizing signal HD, and outputs the signal to the preamplifier 2. The preamplifier 2 takes out, for example, RGB video signals of three colors R (Red), G (Green) and B (Blue) in the case of a three-plate type camera by sampling the electric signal outputted from the OB-integrated CCD 6 at a predetermined sampling frequency in synchronization with the vertical synchronizing signal VD and the horizontal synchronizing signal HD, and thereafter amplifies the signal to output the amplified video signal to the adder 5 and the plurality of n A/D converters 30-1 to 30-n. In the following signal processing, the signals are processed individually by the three colors R, G and B.

The dark shading correction circuit 503 of the third preferred embodiment comprises a plurality of n A/D converters 30-1 to 30-n, a plurality of n latch circuits 31-1 to 31-n (collectively denoted by the reference numeral 31), a timing signal generator 21, a microcomputer 20, a D/A converter 22, a low-pass filter 23 and an adder 5.

As shown in FIG. 9, the timing signal generator 21 generates first to n-th designation pulse signals S1 to Sn each of which corresponds to the OB section 200 and has a pulse width of an interval corresponding to the width in the horizontal scanning direction of the OB section 200 at a plurality of n timings t1, t2, . . . , tn obtained by dividing one vertical interval from the trailing timing of the vertical synchronizing signal VD via a vertical blanking interval (not shown) to the rise timing of the next vertical synchronizing signal VD after the vertical blanking interval at equal intervals of, for example, one horizontal interval 1H, 2H, 3H or the like, and outputs the signals to the plurality of n A/D converters 30 and the plurality of n latch circuits 31. Further, as shown in FIG. 9, the timing signal generator 21 generates a timing signal TS at a plurality of m timings (where m is a natural number equal to or larger than n) obtained by dividing one vertical interval from the trailing timing of the vertical synchronizing signal VD via a vertical blanking interval (not shown) to the rise timing of the next vertical synchronizing signal VD after the vertical blanking interval at equal intervals of, for example, one horizontal interval 1H, 2H or the like, and outputs the signal to the microcomputer 20 and the D/A converter 22.

The A/D converters 30 sample the OB signal of the video signal inputted from the preamplifier 2 in synchronization with the first to n-th designation pulse signals to subject the sampled signals to A/D conversion and output the resulting signals to the latch circuits 31. The latch circuits 31 latch the digital data D1, D2, . . . , Dn of the inputted OB signal in synchronization with the first to n-th designation pulse signals and output the resulting signals to the microcomputer 20.

Figure 10:
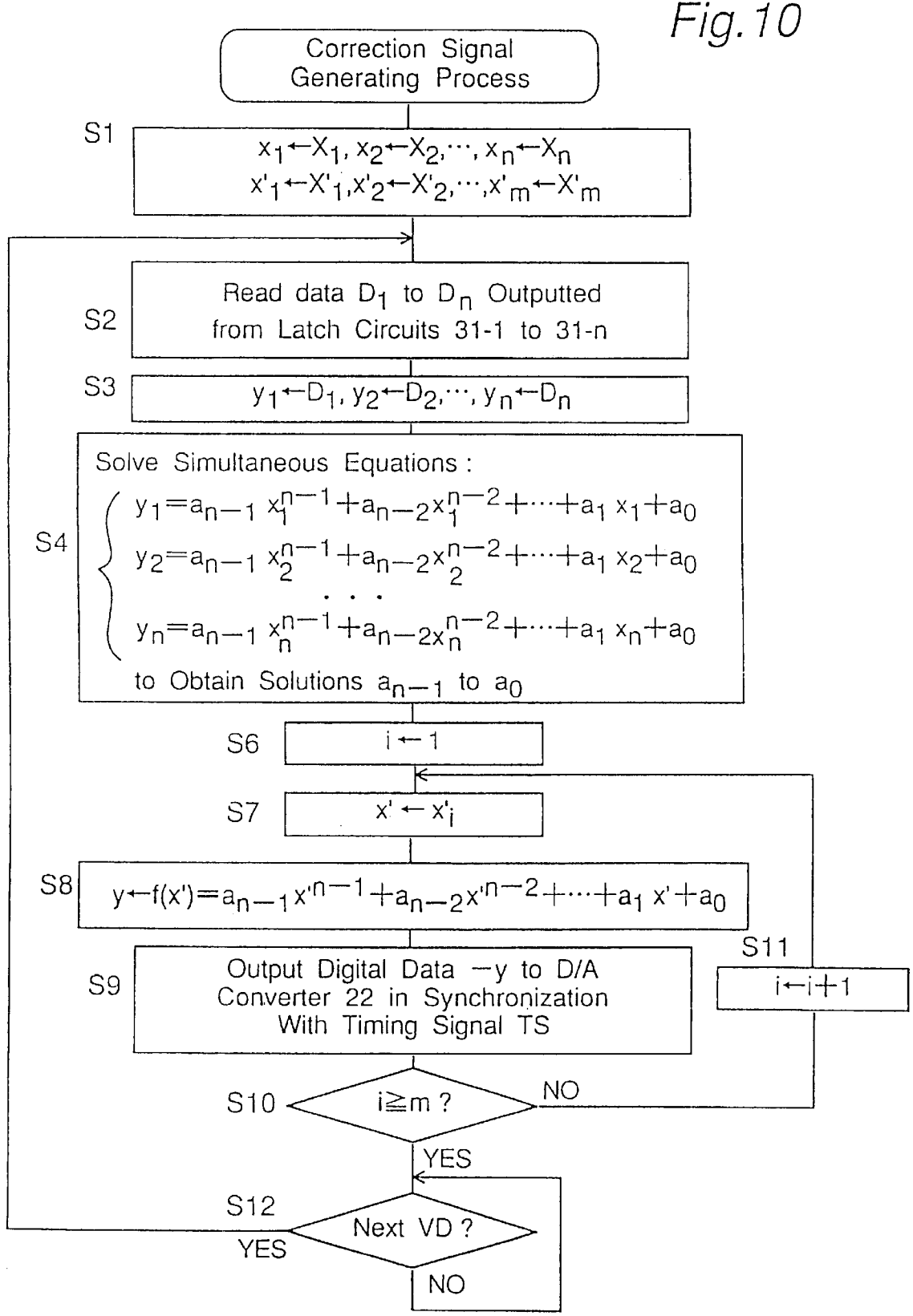
FIG. 10 is a flowchart showing a correction signal generating process executed by a microcomputer 20 of the dark shading correction circuit 503 of the third preferred embodiment shown in FIG. 3.

The microcomputer 20 comprises a CPU (Central Processing Unit) 20a which executes a correction signal generating process as shown in FIG. 10, a ROM (Read Only Memory) 20b which previously stores a program for the correction signal generating process and data necessary for executing the program and a RAM (Random Access Memory) 20c which is used as a work area of the CPU 20a and temporarily stores therein data upon executing the program of the correction signal generating process. The microcomputer 20 executes the correction signal generating process shown in FIG. 10 based on the digital data D1, D2, . . . , Dn of the n OB signals inputted from the A/D converters 30 in synchronization with the vertical synchronizing signal VD and the timing signal TS, generates the correction signal STA in synchronization with the timing signal TS and outputs the signal to the adder 5 via the D/A converter 22 and the low-pass filter 23. In this case, the D/A converter 22 subjects the correction signal STA outputted from the microcomputer 20 to D/A conversion in synchronization with the timing signal TS and outputs the resulting signal to the low-pass filter 23. In response to this operation, the low-pass filter 23 removes clock noises and the like contained in the inputted analog correction signal STA and outputs the analog correction signal STA to the adder 5.

In the above-mentioned correction signal generating process, the dark shading signal component DS contained in the OB signal of the video signal outputted from the preamplifier 2 is functionally approximated to the (n−1)-th order function f(x) expressed by the following equation (1) by means of an interpolating method, and n coefficient values $a_{n-1}, a_{n-2}, \ldots, a_1, a_0$ of the functionally approximated (n−1)-th order function are obtained by solving the simultaneous equations with n unknowns expressed by the following equation (2).

$$f(x) = a_{n-1}x^{n-1} + a_{n-2}x^{n-2} + \ldots + a_1 x + a_0 \qquad (1)$$

$$y_i = a_{n-1}x_i^{n-1} + a_{n-2}x_i^{n-2} + \ldots + a_1 x_i + a_0, \; i=1, 2, \ldots, n \qquad (2)$$

In this case, the digital data D1, D2, . . . , Dn of the OB signal taken in from the latch circuits 31 for, for example, the vertical blanking interval are each substituted into $x_i$ (i=1, 2, . . . , n) in the equation (2). Then, the microcomputer 20 generates a correction signal STA of −f(x') having a polarity opposite to that of the function f(x) by means of the function f(x) expressed by the above equation (1) with the above-mentioned n coefficient values $a_{n-1}, a_{n-2}, \ldots, a_1, a_0$ included in synchronization with the timing signal TS, and outputs the signal to the adder 5 via the D/A converter 22 and the low-pass filter 23. In this case, the correction signal STA of −f(x') is generated discretely by changing the variable x by incrementing the same in synchronization with the timing signal at the above-mentioned plurality of m timings.

Furthermore, by outputting the correction signal STA from the microcomputer 20 to the adder 5 via the D/A converter 22 and the low-pass filter 23, the dark shading correction can be executed by canceling the dark shading signal component DS of the video signal outputted from the preamplifier 2 by means of the correction signal STA. The adder 5 adds the video signal inputted from the preamplifier 2 to the correction signal STA inputted from the low-pass filter 23, and outputs a video signal having a signal level of a result of addition as a video signal after the dark shading correction to the video signal processing circuit 13. The video signal processing circuit 13 executes the gamma processing and the matrix signal processing for conversion into, for example, an NTSC signal, and outputs the processed video signal to the magnetic recording and reproducing apparatus 14 for recording the signal on, for example, a magnetic tape.

FIG. 10 is a flowchart showing a correction signal generating process executed by the microcomputer 20 of the dark shading correction circuit 503 of the third preferred embodiment shown in FIG. 3. In FIG. 10, the process of step S1 is executed when the power of the television camera is turned on, and the processes of the steps S2 to S6 are executed, for example, for the vertical blanking interval. The processes of the steps S7 to S10 are executed based on the timing signal TS, and the process of step S9 is executed in synchronization with the timing signal TS.

In FIG. 10, first of all, in step S1, a variable value $X_i$ (i=1, 2, . . . , n) predetermined as above is substituted into the variable value $x_i$ (i=1, 2, . . . , n) when sampling the dark shading signal component, and a variable value $X'_i$ (i=1, 2, . . . , m) predetermined as above is substituted into the variable value $x'_i$ (i=1, 2, . . . , m) when generating the function −f(x') of the correction signal STA. Then, in step S2, the digital data D1 to Dn of the OB signal outputted from the latch circuits 31 are taken in, and the digital data D1 to Dn of the OB signal are substituted into function values $y_1$ to $y_n$, respectively in step S3. Then, in step S4, the simultaneous equations with n unknowns expressed by the equation (2) are solved to obtain solutions $a_{n-1}$ to $a_0$ of the coefficient values. After the parameter i is reset to 1 in step S6, the variable value $x'_i$ is substituted into the variable value x' in step S7, and the value of the right side of the following equation (3) is calculated to be a digital data y in step S8.

$$f(x') = a_{n-1}x'^{m-1} + a_{n-2}x'^{m-2} + \ldots + a_1 x' + a_0 \qquad (3)$$

Then, a digital data −y that is the negative value of the digital data y is outputted to the D/A converter 22 in step S9, and then, a correction signal STA having a D/A-converted value of the digital data −y is outputted to the adder 5 via the low-pass filter 23. Further, it is decided in step S10 whether or not the parameter i is equal to or larger than m. When the answer is NO, the parameter i is incremented by one in step S11, and thereafter the program flow proceeds to step S7. When the answer is YES in step S10, waiting is effected for the next vertical synchronizing signal in step S12. When the next vertical synchronizing signal comes or is inputted, the program flow returns to step S2 to repeat the above-mentioned processing.

In the dark shading correction circuit 503 constructed as above, the plurality of n A/D converters 30, the plurality of n latch circuits 31, the microcomputer 20, the D/A converter 22, the low-pass filter 23 and the adder 5 constitute a feed forward control type control loop. When the dark shading signal component DS outputted from the CCD 6 via the preamplifier 2 changes due to the rise of environmental temperature, aging or the like of the OB-integrated CCD 6, the negative correction signal STA that has been functionally approximated to the dark shading signal component DS is changed so that its waveform becomes identical to the waveform of the dark shading signal component. That is, according to the variation of the dark shading signal component DS, the waveform of the correction signal STA is changed likewise, thereby canceling the dark shading signal component DS by means of the correction signal STA. By the above operation, the dark shading correction can be executed automatically and adaptively so that the remaining dark shading signal component is minimized, thereby allowing the remaining dark shading signal component to be always canceled. As a result, a quality video signal having almost no remaining dark shading signal component can be obtained in the video signal from the adder 5.

As described above, according to the television camera provided with the dark shading correction circuit 503 of the present embodiment, the dark shading correction is executed by canceling the dark shading signal component DS of the video signal outputted from the preamplifier 2 by means of the correction signal STA that has been functionally approximated to the dark shading signal component DS. With the above arrangement, even when the dark shading signal component DS changes due to a change in the environmental temperature, aging or the like, the shading correction is executed automatically and adaptively so that the remaining dark shading signal component is minimized by canceling the dark shading signal component, thereby allowing a quality video signal having almost no remaining dark shading signal component to be always generated for maintaining good image quality of the video signal.

FOURTH PREFERRED EMBODIMENT

Figure 4:
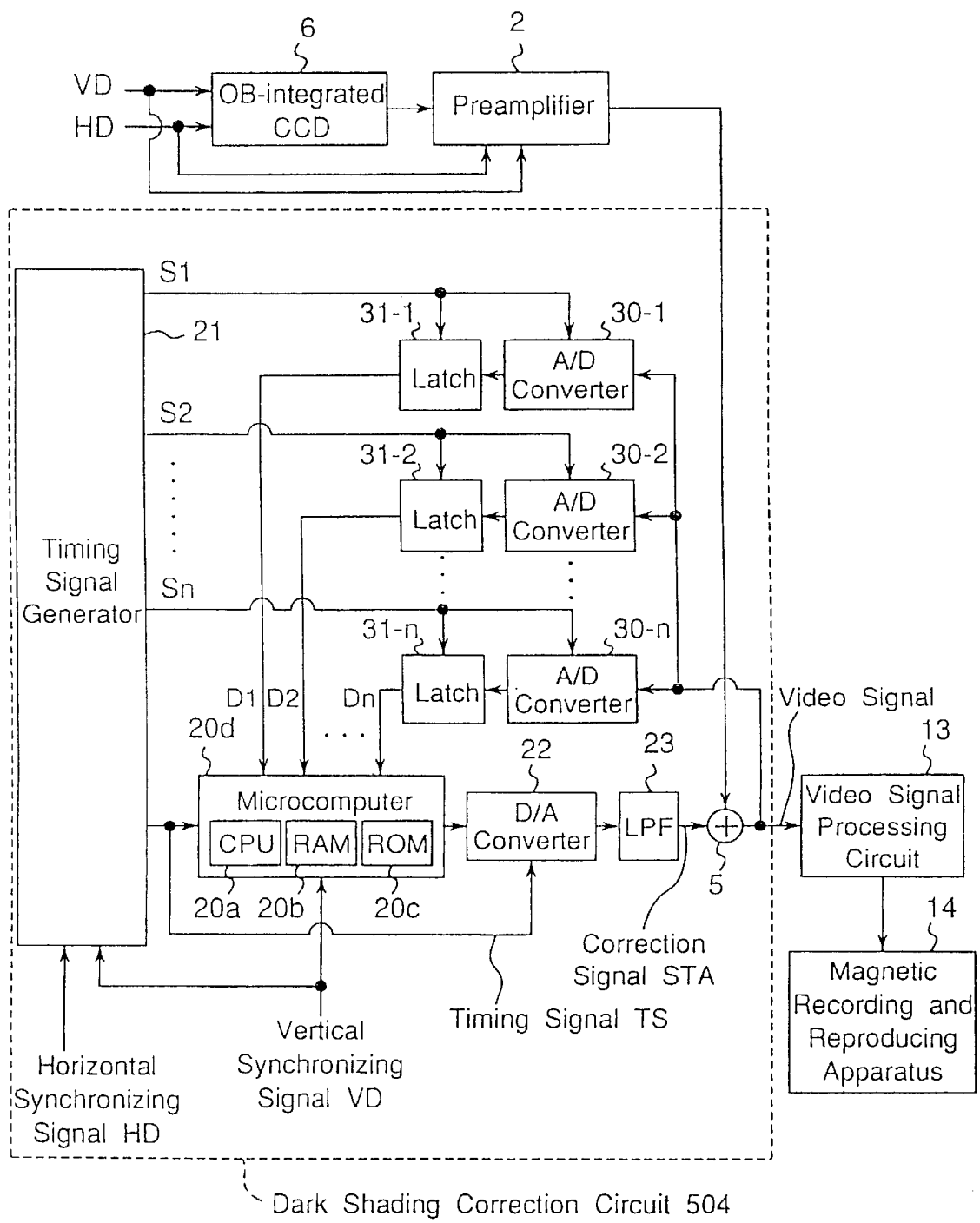
FIG. 4 is a block diagram showing a construction of a television camera provided with a dark shading correction circuit 504 according to a fourth preferred embodiment of the present invention.

FIG. 4 is a block diagram showing a construction of a television camera provided with a dark shading correction circuit 504 according to a fourth preferred embodiment of the present invention. The dark shading correction circuit 504 of the fourth preferred embodiment differs from the third preferred embodiment shown in FIG. 3 in the following points.

(a) The video signal outputted from the preamplifier 2 is inputted to only the adder 5, and the video signal outputted from the adder 5 is inputted to the A/D converters 30.

Figure 11:
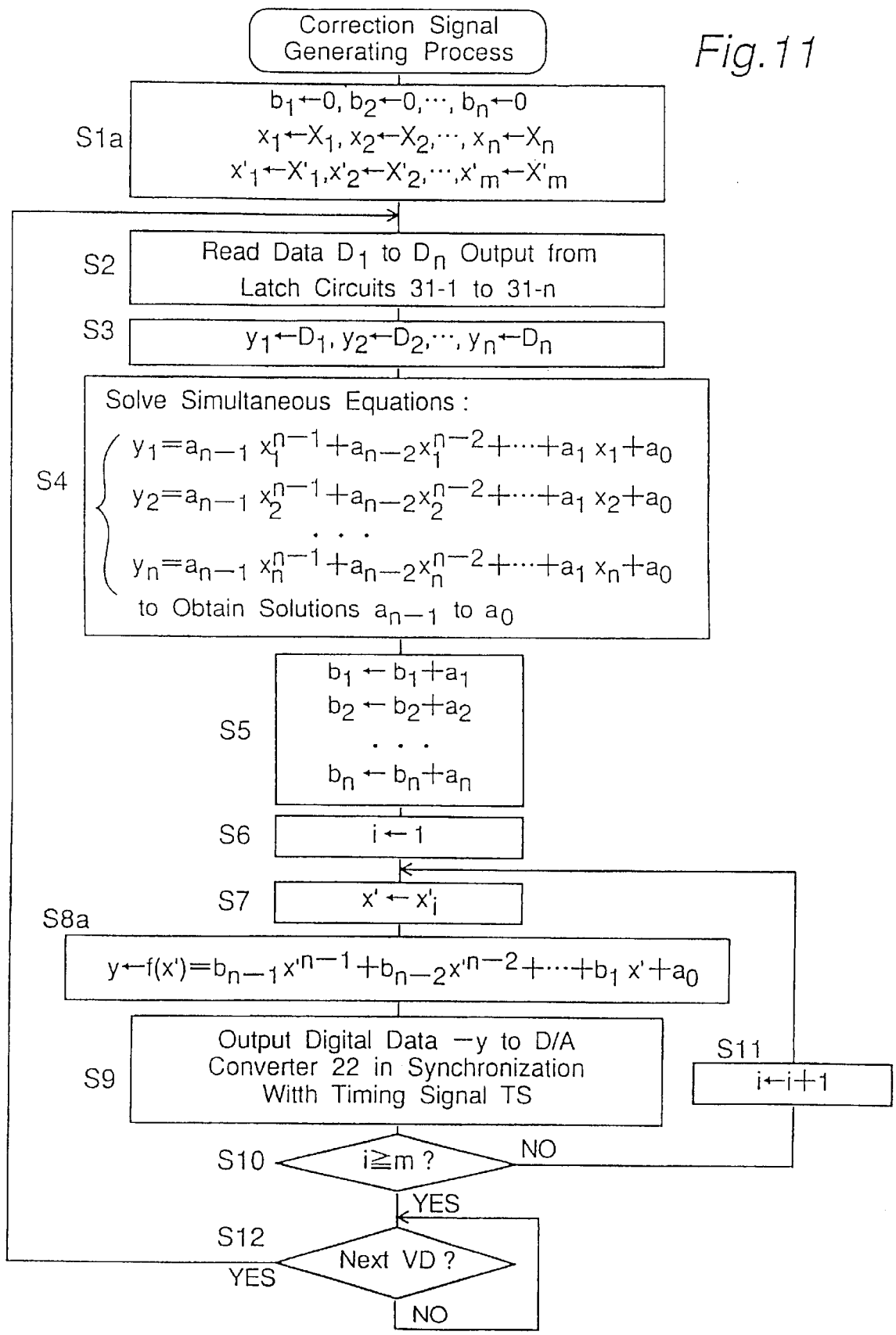
FIG. 11 is a flowchart showing a correction signal generating process executed by a microcomputer 20d of the dark shading correction circuit 504 of the fourth preferred embodiment shown in FIG. 4.

(b) A microcomputer 20d which executes a correction signal generating process as shown in FIG. 11 is provided in place of the microcomputer 20 which executes the correction signal generating process shown in FIG. 10.

The above-mentioned points of difference will be described in detail below.

The A/D converters 30 sample the OB signal of the video signal outputted from the adder 5 in synchronization with the first to n-th designation pulse signals, subject the sampled signals to A/D conversion and output the resulting signals to the latch circuits 31. The latch circuits 31 latch the digital data D1, D2, . . . , Dn of the inputted OB signal in synchronization with the first to n-th designation pulse signals and thereafter output the data to the microcomputer 20d.

It is to be noted that the dark shading signal component DS in FIG. 9 is a remaining dark shading signal component outputted from the adder 5.

The microcomputer 20d is constructed in a manner similar to that of the microcomputer 20 shown in FIG. 3 and executes the correction signal generating process shown in FIG. 11. The correction signal generating process shown in FIG. 11 differs from the correction signal generating process shown in FIG. 10 in the following points.

(a) A process of step S1a is executed instead of step S1. In this case, in addition to the process of step S1, a process for initializing all the parameters $b_1, b_2, \ldots, b_n$ to zero is executed.

(b) A process of step S5 is executed between step S4 and step S6. In step S5, a value obtained by adding the coefficient value $a_1$ to the parameter $b_1$ is substituted into the parameter $b_1$, a value obtained by adding the coefficient value $a_2$ to the parameter $b_2$ is substituted into the parameter $b_2$, and the substituting process will be executed likewise to substitute into the parameter $b_n$ a value obtained by adding the coefficient value $a_n$ to the parameter $b_n$. By this substituting process, a process having an effect similar to that of the integrator 11 of the second preferred embodiment is executed. That is, by obtaining the correction signal STA by successively increasing the plurality of n coefficient values of the above-mentioned equation (2) by the coefficient values $a_{n-1}, a_{n-2}, \ldots, a_1, a_0$ calculated based on the dark shading signal component DS, a correction signal STA corrected by time-integrating the plurality of n coefficient values can be generated.

(c) A process of step S8a is executed instead of step S8. In step S8a, the right side of the following equation (4) is calculated to be the digital data y.

$$f(x')=b_{n-1}x'^{m-1}+b_{n-2}x'^{m-2}+ \ldots +b_1 x'+a_0 \qquad (4)$$

In FIG. 4, by outputting the correction signal STA from the microcomputer 20d to the adder 5 via the D/A converter 22 and the low-pass filter 23, the remaining dark shading signal component remaining in the video signal outputted from the adder 5 can be canceled by means of the correction signal STA, thereby allowing the dark shading correction to be executed. The adder 5 adds the video signal inputted from the preamplifier 2 to the correction signal STA inputted from the low-pass filter 23, and outputs a video signal having a signal level of a result of addition as a video signal after the dark shading correction to the video signal processing circuit 13. The video signal processing circuit 13 executes the gamma processing and the matrix signal processing for conversion into, for example, an NTSC signal, and outputs the processed video signal to a magnetic recording and reproducing apparatus 14 for recording the signal on, for example, a magnetic tape.

In the dark shading correction circuit 504 constructed as above, the plurality of n A/D converters 30, the plurality of n latch circuits 31, the microcomputer 20, the D/A converter 22, the low-pass filter 23 and the adder 5 constitute a feedback control type control loop. When the dark shading signal component DS outputted from the CCD 6 via the preamplifier 2 changes due to the rise of environmental temperature, aging or the like of the OB-integrated CCD 6, the negative correction signal STA having a function value of a function obtained based on the coefficient values of the parameters $b_1, b_2, \ldots, b_n$ which are corrected so that the coefficient values $a_1, a_2, \ldots, a_n$ are integrated based on the coefficient values $a_1, a_2, \ldots, a_n$ of the function that approximates the remaining dark shading signal component outputted from the adder 5 to the function is changed in a manner that its waveform becomes similar to the waveform of the dark shading signal component. That is, according to the variation of the remaining dark shading signal component, the waveform of the correction signal STA is changed likewise, thereby canceling the dark shading signal component by means of the correction signal STA. By the above operation, the dark shading correction can be executed automatically and adaptively so that the remaining dark shading signal component is minimized, thereby allowing the dark shading signal component to be always canceled. As a result, a quality video signal having almost no remaining dark shading signal component can be obtained in the video signal from the adder 5.

As described above, according to the television camera provided with the dark shading correction circuit 504 of the present embodiment, the dark shading correction is executed by canceling the remaining dark shading signal component of the video signal outputted from the adder 5 by means of the negative correction signal STA having a function value of a function obtained based on the coefficient values of the parameters $b_1, b_2, \ldots, b_n$ which are corrected so that the coefficient values $a_1, a_2, \ldots, a_n$ are integrated based on the coefficient values $a_1, a_2, \ldots, a_n$ of the function that approximates the remaining dark shading signal component to the function. With the above arrangement, even when the dark shading signal component changes due to a change in the environmental temperature, aging or the like, the shading correction is executed automatically and adaptively so that the remaining dark shading signal component is minimized by canceling the dark shading signal component, thereby allowing a quality video signal having almost no remaining dark shading signal component to be always generated for maintaining good image quality of the video signal.

MODIFIED PREFERRED EMBODIMENTS

In the above-mentioned first and second preferred embodiments, the first designation pulse signal S1 is generated at the timing ti corresponding to the OB section 200 of the sixth horizontal scanning interval from the vertical synchronizing signal VD, while the second designation pulse signal S2 is generated at the timing t2 corresponding to the OB section 200 of the 489th horizontal scanning interval from the vertical synchronizing signal VD. However, the present invention is not limited to this, and the first and second designation pulse signals S1 and S2 may be generated as follows. Preferably, the first designation pulse signal S1 may be generated at the timing t1 corresponding to the OB section 200 for at least one horizontal scanning interval out of the second to eleventh horizontal scanning intervals from the vertical synchronizing signal VD, while the second designation pulse signal S2 may be generated at the timing t2 corresponding to the OB section 200 for at least one horizontal scanning interval out of the 478th to 487th horizontal scanning intervals from the vertical synchronizing signal VD. That is, the first designation pulse signal S1 may be generated at the timing t1 corresponding to the OB section 200 within one predetermined horizontal scanning interval positioned in an upper portion of the OB-integrated CCD 6, while the second designation pulse signal S2 may be generated at the timing t2 corresponding to the OB section 200 within one predetermined horizontal scanning interval positioned in a lower portion of the OB-integrated CCD 6.

Furthermore, in the above-mentioned preferred embodiments, the OB signal is sampled in accordance with the two timings t1 and t2 for one horizontal interval from a vertical synchronizing signal VD to the next vertical synchronizing signal VD. However, the present invention is not limited to this, and the dark shading correction may be executed by sampling the OB signal in accordance with three or more timings and varying the amplitude and inclination of the sawtooth wave signal so that the remaining dark shading signal component is minimized based on the difference of the OB signal sampled in accordance with adjacent two timings.

In the above-mentioned preferred embodiments, the CCD 6 which has its OB section 200 of the right-hand end portion in the horizontal scanning direction is employed. However, the present invention is not limited to this, and it is acceptable to employ a variety of OB-integrated CCDs such as a CCD which has its OB section 200 of the left-hand end portion in the horizontal scanning direction or a CCD which has its OB section 200 in both end portions in the horizontal scanning direction. In this case, it is required to alter the timing at which the designation pulse signals are generated by the timing signal generators 20 and 21 so that a predetermined plurality of OB signals are sampled depending on the employed OB-integrated CCD.

In the above-mentioned third and fourth preferred embodiments, the timing signal generator 21 generates the timing signal TS at the plurality of m timings (m is a natural number equal or larger than n) obtained by dividing one vertical interval at equal intervals as shown in FIG. 9. However, the present invention is not limited to this, and the timing signal TS may be generated at a plurality of m timings (m is a natural number equal to or larger than n) obtained by dividing one vertical interval at unequal intervals. For example, since the dark shading signal component DS abruptly changes due to the driving current of the driving circuit of the CCD 6 immediately after the vertical blanking interval, it is acceptable to generate a greater number of designation pulse signals, or the timing signals in the proximity of the timing immediately after the vertical blanking interval, thereby improving the accuracy of the functional approximation. Furthermore, also in the first and second preferred embodiments, when the designation pulse signals, or the timing signals are generated at three or more points, it is preferable to set some of the timings at which the signals are to be generated in the proximity of the timing immediately after the vertical blanking interval.

INDUSTRIAL APPLICABILITY

As described above, according to the present invention, there is detected and outputted at least two optical black reference signals contained in the video signal outputted from the image pickup device based on at least two timing signals outputted from the timing signal generating means, a correction signal is generated for correcting the video signal outputted from the image pickup device in synchronization with the vertical synchronizing signal in a manner that the dark shading signal component contained in the video signal outputted from the image pickup device is canceled based on the at least two optical black reference signals, and the video signal outputted from the image pickup device is added to the correction signal, then the dark shading signal component contained in the video signal is substantially canceled, and a video signal which has undergone the dark shading correction is outputted. The present invention is a dark shading correction circuit to be applied to a television camera or a video camera. Even when the dark shading signal component changes due to a change in the environmental temperature, aging or the like, the shading correction is executed automatically and adaptively so that the dark shading signal component is minimized, thereby allowing an image quality with a small quantity of remaining dark shading signal component to be maintained.

What is claimed is:

1. A dark shading correction circuit comprising:
   an image pickup device for, in synchronization with a vertical synchronizing signal, outputting a video signal containing an optical black reference signal outputted in response to each horizontal scanning signal;
   timing signal generating means for generating and outputting at least two timing signals for detecting the optical black reference signal in the video signal;
   detection means for detecting and outputting a plurality of n optical black reference signals contained in the video signal outputted from said image pickup device based on the at least two timing signals outputted from said timing signals generating means;
   correction signal generating means for generating and outputting a correction signal for correcting the video signal outputted from said image pickup device in synchronization with the vertical synchronizing signal, based on the plurality of n optical black reference signals outputted from said detection means, so that a dark shading signal component contained in the video signal outputted from said image pickup device is canceled; and adder means for adding the video signal outputted from said image pickup device to the correction signal outputted from said correction signal generating means, thereby substantially canceling the dark shading signal component contained in the video signal outputted from said image pickup device, and for outputting the video signal which has undergone the dark shading correction.

2. The dark shading correction circuit as claimed in claim 1, wherein said correction signal generating means comprises:

sawtooth wave signal generating means for generating a sawtooth wave signal having a sawtooth signal waveform for canceling the dark shading signal component contained in the video signal outputted from said image pickup device;

subtracter means for calculating a difference between each combination of the plurality of n optical black reference signals outputted from said detection means and for generating and outputting a difference signal representing the calculated difference; and amplitude adjusting means for executing an adjustment, based on the difference signal outputted from said subtracter means, so that an amplitude of the sawtooth wave signal outputted from said sawtooth wave signal generating means is proportional to the difference signal, and for outputting the sawtooth wave signal whose amplitude has been adjusted as a correction signal.

3. The dark shading correction circuit as claimed in claim 1, wherein said correction signal generating means comprises:

control means for functionally approximating the dark shading signal component contained in the plurality of n optical black reference signals to a predetermined $(n-1)$-th order function, based on the plurality of n optical black reference signals outputted from said detection means, for calculating n coefficient values of the functionally approximated $(n-1)$-th order function, and for generating and outputting a correction signal for correcting the video signal outputted from said image pickup device so that the dark shading signal component contained in the video signal outputted from said image pickup device is canceled by means of the $(n-1)$-th order function containing the calculated n coefficient values.

4. A dark shading correction circuit comprising:

an image pickup device for, in synchronization with a vertical synchronizing signal, outputting a video signal containing an optical black reference signal outputted in response to each horizontal scanning signal;

timing signal generating means for generating and outputting at least two timing signals for detecting the optical black reference signal in the video signal;

adder means for adding the video signal outputted from said image pickup device to a correction signal for effecting dark shading correction on the video signal, and for outputting the video signal of a result of addition;

detection means for detecting and outputting a plurality of n optical black reference signals contained in the video signal outputted from said adder means based on at least two timing signals outputted from said timing signal generating means; and correction signal generating means for generating a correction signal for correcting the video signal outputted from said image pickup device in synchronization with the vertical synchronizing signal, based on the plurality of n optical black reference signals outputted from said detection means, so that a remaining dark shading signal component contained in the video signal outputted from said adder means is canceled, and for outputting the correction signal to said adder means, said adder means adding the video signal outputted from said image pickup device to the correction signal outputted from said correction signal generating means, thereby substantially canceling the remaining dark shading signal component contained in the video signal outputted from said adder means and outputting the video signal which has undergone the dark shading correction.

5. The dark shading correction circuit as claimed in claim 4, wherein said correction signal generating means comprises:

sawtooth wave signal generating means for generating a sawtooth wave signal having a sawtooth wave signal waveform for canceling the dark shading signal component contained in the video signal outputted from said image pickup device;

subtracter means for calculating a difference between each combination of the plurality of n optical black reference signals outputted from said detection means and for generating and outputting a difference signal representing the calculated difference;

integration means for time-integration the difference signal outputted from said subtracter means, and for generating and outputting a time-integrated integration signal; and amplitude adjusting means for executing an adjustment, based on the integration signal outputted from said integration means, so that an amplitude of the sawtooth wave signal outputted from said sawtooth wave signal generating means is proportional to the integration signal, and for outputting the sawtooth wave signal whose amplitude has been adjusted as a correction signal.

6. The dark shading correction circuit as claimed in claim 4, wherein said correction signal generating means comprises:

control means for functionally approximating the dark shading signal component contained in the plurality of n optical black reference signals to a predetermined $(n-1)$-th order function, based on the plurality of n optical black reference signals outputted from said detection means, for calculating n coefficient values of the functionally approximated $(n-1)$-th order function, and for generating and outputting a correction signal for correcting the video signal outputted from said image pickup device so that the dark shading signal component contained in the video signal outputted from said image pickup device is canceled by means of the $(n-1)$-th order function containing the calculated n coefficient values.

* * * * *